United States Patent
Wang et al.

(10) Patent No.: US 12,242,676 B2
(45) Date of Patent: Mar. 4, 2025

(54) INPUT DEVICE

(71) Applicant: Apple Inc., Cupertino, CA (US)

(72) Inventors: Wenhao Wang, Shanghai (CN); Yuanzhen Fan, Shanghai (CN); Haixiang Hu, Guangdong (CN)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 18/340,260

(22) Filed: Jun. 23, 2023

(65) Prior Publication Data

US 2024/0427437 A1     Dec. 26, 2024

(51) Int. Cl.
| | |
|---|---|
| *G06F 3/0354* | (2013.01) |
| *G06F 1/16* | (2006.01) |
| *G06F 3/01* | (2006.01) |
| *G06F 3/02* | (2006.01) |
| *G06F 3/044* | (2006.01) |

(52) U.S. Cl.
CPC ........ *G06F 3/03547* (2013.01); *G06F 1/1662* (2013.01); *G06F 1/169* (2013.01); *G06F 3/021* (2013.01); *G06F 3/044* (2013.01); *G06F 3/016* (2013.01); *G06F 2203/04102* (2013.01)

(58) Field of Classification Search
CPC .... G06F 3/03547; G06F 1/1662; G06F 1/169; G06F 3/021; G06F 3/044; G06F 3/016; G06F 2203/04102
See application file for complete search history.

(56) References Cited

U.S. PATENT DOCUMENTS

| | | | | |
|---|---|---|---|---|
| 8,384,679 B2* | 2/2013 | Paleczny | ................ | G06F 3/016 |
| | | | | 345/173 |
| 8,860,671 B2* | 10/2014 | Jung | ................... | G06F 3/03547 |
| | | | | 345/173 |
| 9,069,394 B2* | 6/2015 | Clayton | .............. | G06F 3/03547 |
| 9,092,065 B2* | 7/2015 | Hsueh | ....................... | G06F 1/169 |
| 9,292,051 B2* | 3/2016 | Takata | .................... | G06F 1/169 |
| 9,465,416 B2* | 10/2016 | Shen | ...................... | G06F 1/1692 |
| 9,772,688 B2* | 9/2017 | Patel | ....................... | H01F 7/126 |
| 10,108,265 B2* | 10/2018 | Harley | .................... | G06F 3/016 |
| 10,725,567 B1* | 7/2020 | Huang | .................. | G06F 1/1671 |
| 11,287,907 B1* | 3/2022 | Li | ........................ | G06F 3/03547 |
| 11,442,562 B2 | 9/2022 | Li | | |
| 11,449,156 B1* | 9/2022 | Li | .......................... | G06F 1/1616 |
| 11,537,222 B2* | 12/2022 | Hou | ..................... | G06F 3/03547 |
| 11,650,680 B2* | 5/2023 | Huang | ................... | G06F 1/169 |
| | | | | 345/173 |
| 11,953,952 B2* | 4/2024 | Degner | .............. | G06F 3/03547 |

(Continued)

*Primary Examiner* — Benyam Ketema
(74) *Attorney, Agent, or Firm* — Dorsey & Whitney LLP (57) ABSTRACT

A keyboard of the present disclosure has a keyboard housing with a base plate defining a trackpad opening. The keyboard can also include a trackpad assembly disposed within the trackpad opening, the trackpad assembly including: a touch input plate configured to receive a user touch input and positioned above the base plate; and a flexure positioned below the base plate. In some examples the flexure includes: a first attachment portion attached to the touch input plate; a second attachment portion attached to the base plate; and at least one flexible portion connecting the first attachment portion to the second attachment portion and biasing the first attachment portion upward relative to the second attachment portion.

20 Claims, 7 Drawing Sheets

(56) References Cited

U.S. PATENT DOCUMENTS

| | | | |
|---|---|---|---|
| 2002/0033795 A1* | 3/2002 | Shahoian | G06F 3/03547 345/156 |
| 2006/0250377 A1* | 11/2006 | Zadesky | G06F 1/169 345/173 |
| 2008/0202824 A1* | 8/2008 | Philipp | G06F 3/0338 178/18.01 |
| 2010/0079404 A1* | 4/2010 | Degner | G06F 3/042 345/173 |
| 2010/0182263 A1* | 7/2010 | Aunio | G06F 3/016 345/173 |
| 2011/0141052 A1* | 6/2011 | Bernstein | G06F 3/041 341/5 |
| 2012/0103773 A1* | 5/2012 | Villain | G06F 3/03547 200/344 |
| 2013/0207928 A1* | 8/2013 | Takata | G06F 3/03547 345/174 |
| 2015/0009156 A1* | 1/2015 | Hsueh | H01H 3/125 345/173 |
| 2015/0185769 A1* | 7/2015 | Takata | G06F 1/169 345/173 |
| 2016/0091972 A1* | 3/2016 | Patel | G06F 3/041 345/173 |
| 2017/0038801 A1* | 2/2017 | Lee | G06F 3/041 |
| 2017/0285848 A1* | 10/2017 | Rosenberg | G06F 3/04883 |
| 2018/0081438 A1* | 3/2018 | Lehmann | G06F 3/0202 |
| 2018/0107378 A1* | 4/2018 | Rosenberg | G06F 3/04144 |
| 2019/0041903 A1* | 2/2019 | Shah | G06F 1/169 |
| 2019/0073079 A1* | 3/2019 | Xu | G06F 3/0416 |
| 2019/0243475 A1* | 8/2019 | Huang | G06F 1/1681 |
| 2019/0369759 A1* | 12/2019 | Costante | G06F 1/169 |
| 2019/0384426 A1* | 12/2019 | Huang | G06F 3/0362 |
| 2020/0233557 A1* | 7/2020 | Sato | G06F 3/04142 |
| 2021/0240282 A1* | 8/2021 | Gajiwala | G06F 3/016 |
| 2021/0263556 A1* | 8/2021 | Degner | G06F 3/04883 |
| 2022/0066580 A1* | 3/2022 | Lin | G06F 3/03547 |
| 2022/0113819 A1* | 4/2022 | Li | G06F 1/169 |
| 2022/0326791 A1* | 10/2022 | Li | G06F 1/1616 |
| 2022/0342496 A1* | 10/2022 | Hou | G06F 3/03547 |
| 2022/0365557 A1* | 11/2022 | Li | G06F 1/169 |
| 2022/0365558 A1* | 11/2022 | Degner | G06F 3/016 |

* cited by examiner

INPUT DEVICE

FIELD

The described embodiments relate generally to electronic input devices. More particularly, the present embodiments relate to trackpads and/or keyboards comprising trackpads.

BACKGROUND

Input devices for computing devices have many purposes and can be used in many different ways. Trackpads, for example, are input devices that can receive touch inputs in the form of clicks, swipes, taps, or other haptic inputs from a user. Such trackpads can be standalone trackpads or integrated with a keyboard (e.g., a standalone keyboard, a folio/detachable keyboard for a tablet device, a laptop keyboard, etc.).

Trackpads typically include structures that provide poor tactile feedback, such as low click ratios, location-dependent click ratios, unsatisfactory ergonomics, inconsistent touch and feel, poor input detection, undesirable sound properties, and so on. Therefore, there is a constant need for improvements to touch input devices.

SUMMARY

A keyboard of the present disclosure can include a keyboard housing with a base plate defining a trackpad opening. The keyboard can also include a trackpad assembly disposed within the trackpad opening, the trackpad assembly including a touch input plate configured to receive a user touch input and positioned above the base plate, and a flexure positioned below the base plate. In some examples the flexure includes a first attachment portion attached to the touch input plate, a second attachment portion attached to the base plate, and at least one flexible portion connecting the first attachment portion to the second attachment portion and biasing the first attachment portion upward relative to the second attachment portion.

In one or more examples, the touch input plate moves toward the base plate while bending the at least one flexible portion in response to application of a downward force on the touch input plate. In some examples, the flexure can include a preformed bend. In at least one example, the flexure can include a flattened state and a flexed state. In certain examples, a bottom portion of the preformed bend is biased upward toward the base plate to the flattened state when at rest, and the flexure is movable to the flexed state in response to the user touch input.

In one or more examples, the at least one flexible portion can include a set of flexible beams. In particular instances, the set of flexible beams is positioned outside a perimeter of the first attachment portion. Further, in some examples, flexible beams of the set of flexible beams are symmetrically arranged relative to a centerline of the flexure. In some examples, the first attachment portion can include a frame member movable with the touch input plate relative to the second attachment portion. Additionally or alternatively, in some examples, the second attachment portion is stationary relative to the first attachment portion in response to receiving the user touch input. In one example, the base plate is integrally formed with the keyboard housing.

A trackpad assembly of the present disclosure can include: a top panel having a top surface, a housing panel, a switch positioned between the top panel and the housing panel, and a support positioned below the housing panel and connected with an upward bias to the top panel, the support including a lateral portion extending under the housing panel. In these or other examples, in response to an off-center input load applied at the top surface, the top panel rotates about an axis extending through the lateral portion of the support while depressing the switch. In at least one example, in response to a central input load applied at the top surface, the top panel translates downward and causes the support to flex against the upward bias.

In some examples, when the off-center input load is applied at the top surface, the lateral portion can include a first lateral portion contacting a bottom side of the housing panel, and a second lateral portion having moved away from the bottom side of the housing panel. In one or more examples, when the central input load is applied at the top surface, the lateral portion can include a first lateral portion having moved away from the bottom side of the housing panel, and a second lateral portion having moved away from the bottom side of the housing panel.

In particular examples, a click ratio for depressing the switch is the same irrespective of a location of an input load applied at the top panel. Further, in some examples, a bottom side of the housing panel is flush with a bottom side of the top panel. In particular examples, the support can include a top surface configured to contact both of a bottom surface of the housing panel and a bottom surface of the top panel. The trackpad assembly can further include a bottom housing panel positioned below the support. In at least one example, the support can include a bottom surface that faces the bottom housing panel.

A computing device of the present disclosure can include an electronic display, a controller unit connected to the electronic display, and a keyboard including a set of key mechanisms and an input device communicatively coupled to the controller unit. In these or other examples, the input device can include a first layer configured to receive a touch input, a housing having a recess to receive the first layer, and a spring member attached to the first layer and to the housing, the spring member having a flattened state and a flexed state. In at least one example, the spring member is biased to the flattened state, and the spring member is movable to the flexed state in response to the touch input.

In some examples, the spring member includes a convex surface facing the housing while in the flexed state. In particular examples, the spring member can include a first spring beam and a second spring beam, and the spring member can include a rectangular frame connecting the first spring beam and the second spring beam. In certain examples, the first spring beam and the second spring beam are U-shaped.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

The following disclosure relates to an input device that includes a trackpad. The trackpad allows users to interact with a computing device in many ways by providing touch inputs to the trackpad. The trackpad can, for instance, receive clicks or taps to provide a digital selection (or other input) at the computing device. As the user provides such touch inputs, users typically expect a tactile response that helps let the user know the touch input was received or detected at the trackpad (and therefore the computing device). The touch input may comprise applying a force to the top of the trackpad that presses the touch surface downward, and the support for the trackpad may provide some resistance or tactile feedback (e.g., a click feeling of force build-up and release) to indicate to the user that the user's press is recognized by the device.

Trackpads of the present disclosure can include certain components and configurations of such components that lend to improved tactile feedback, better ergonomics, and/or increased quality. In particular, a trackpad of the present disclosure can include a unique stack-up of components that help bias a trackpad surface (e.g., a touch input plate) in a way that lends to one or more of the foregoing advantages. For example, trackpads of the present disclosure can include (in a top-down manner) a touch input plate, a switch, an enclosure, and a flexure. The flexure can be positioned below at least a portion of the enclosure. Moreover, the flexure can impart a spring-like biasing action to the touch input plate despite the enclosure being at least partially sandwiched between the flexure and the touch input plate in certain implementations. Variations are herein contemplated and described (e.g., for thinner-profile trackpads).

To provide such a biasing action, the flexure can include an elastically deformable material (e.g., metal) and can include flexible regions (e.g., with preformed bends) that provide a transition between portions attached to the enclosure and other portions attached to the touch input plate. These flexible regions of the flexure can apply a biasing force that resists downward travel of certain portions of the flexure attached to the touch input plate (which moves in response to a user input) while being fixed to other portions of the enclosure. These flexible regions can include flexible beams arranged in many different configurations, including flexible beams arranged in L- or U-shaped configurations. For example, a U-shaped portion may be oriented inwards toward a central region of the flexure relative to an outer frame or rectangular portion of the flexure. In other implementations, the U-shaped configuration of flexible beams is oriented outwards away from a central region of the flexure and extends laterally away from a central frame or rectangular portion. Further, in some examples, certain portions of the flexure can serve as a hooking portion or perform a hooking function that applies upward pressure against the enclosure to help prevent the touch input plate from rising up out of plane during a tilting movement (e.g., in response to an off-center input load). Thus, the flexure can provide both support and flexibility, while also imparting a desired tactile feedback in response to user input.

These and other embodiments are discussed below with reference to FIGS. 1-12H. However, those skilled in the art will readily appreciate that the detailed description given herein with respect to these figures is for explanatory purposes only and should not be construed as limiting. Furthermore, as used herein, a system, a method, an article, a component, a feature, or a sub-feature comprising at least one of a first option, a second option, or a third option should be understood as referring to a system, a method, an article, a component, a feature, or a sub-feature that can include one of each listed option (e.g., only one of the first option, only one of the second option, or only one of the third option), multiple of a single listed option (e.g., two or more of the first option), two options simultaneously (e.g., one of the first option and one of the second option), or combination thereof (e.g., two of the first option and one of the second option).

Figure 1:
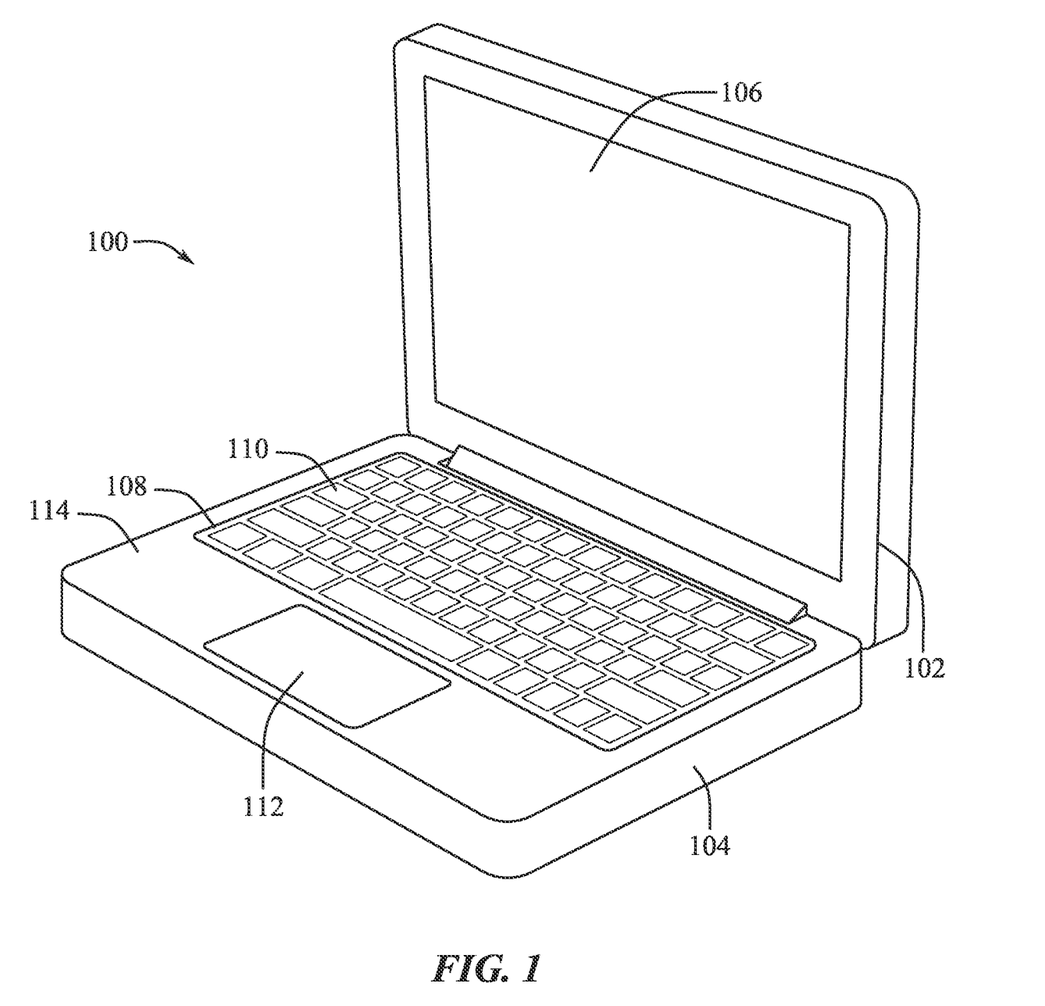
FIG. 1 shows a perspective view of an example computing device.

FIG. 1 illustrates an example embodiment of a computing device 100 having a display housing 102 attached to a keyboard housing 104. The display housing 102 can include a display 106. The keyboard housing 104 can include a keyboard 110 and a trackpad 112 that are accessible through a top surface 114 of the keyboard housing 104. In particular, the keyboard housing 104 can define a recess or trackpad opening for receiving the trackpad 112 (e.g., as a trackpad assembly). The trackpad 112 can be attachable to the keyboard housing 104 (e.g., via fasteners, adhesives, etc.). Additionally or alternatively, a portion of the trackpad 112 (such as a base plate or enclosure component discussed below) can be integrally formed with the keyboard housing 104. In such a case, a base portion or enclosure of the trackpad 112 can define a trackpad opening for receiving other constituent components (discussed below) of the trackpad 112. The keyboard housing 104 can also include a key web 108 which defines a portion of the top surface 114 between and/or around individual keys (or key mechanisms) of the keyboard 110 and which includes multiple openings through which keys of the keyboard 110 can extend to be accessible by the user.

The computing device 100 is shown in FIG. 1 as being a laptop computer, but the computing device 100 can include a variety of different types of computing devices, such as notebook computers, desktop computers, tablet computers, smart phones, servers, similar devices, and combinations thereof. Furthermore, the keyboard housing 104 can be a peripheral input device that is connectable to a computing device (e.g., via a wired or wireless connection) such as a standalone keyboard, a number input pad (e.g., "tenkey" pad), a trackpad, mouse, or other pointer input device, a graphic pen tablet, a case, cover, or peripheral input device for a computing tablet or smartphone, similar devices, and combinations thereof. Thus, the computing device 100 is shown merely as an example device with which aspects of the present disclosure are illustrated for convenience in providing an explanation and should not be viewed as limiting to a laptop computer.

Generally, with a laptop computer-like computing device 100, a processor, memory device, electronic storage device, portable power source or power source connector, circuit boards, keyboard and trackpad controllers, and other related electronic components can be stored in the keyboard housing 104 and/or the display housing 102. For example, the computing device 100 can include a controller unit communicatively coupled to the display 106 (e.g., for controlling the rendering of graphical representations). In these or other examples, such a controller unit can include a processor, system on chip, integrated circuit, driver, microcontroller, application processor, crossover processor, etc. In certain examples, the controller unit can include one or more memory devices (e.g., individual nonvolatile memory, processor-embedded nonvolatile memory, random access memory, memory integrated circuits, DRAM chips, stacked memory modules, storage devices, memory partitions, etc.) Thus, the computing device 100 can include all electrical devices and components necessary for operation of a keyboard 110 including keyboard switches and displays connected to one or more of the keys of the keyboard 110.

Any of the features, components, parts, including the arrangements and configurations thereof shown in FIG. 1 can be included, either alone or in any combination, in any of the other examples of devices, features, components, and parts shown in the other figures. Likewise, any of the features, components, parts, including the arrangements and configurations thereof shown in the other figures can be included, either alone or in any combination, in the example of the devices, features, components, and parts shown in FIG. 1.

Figure 2:
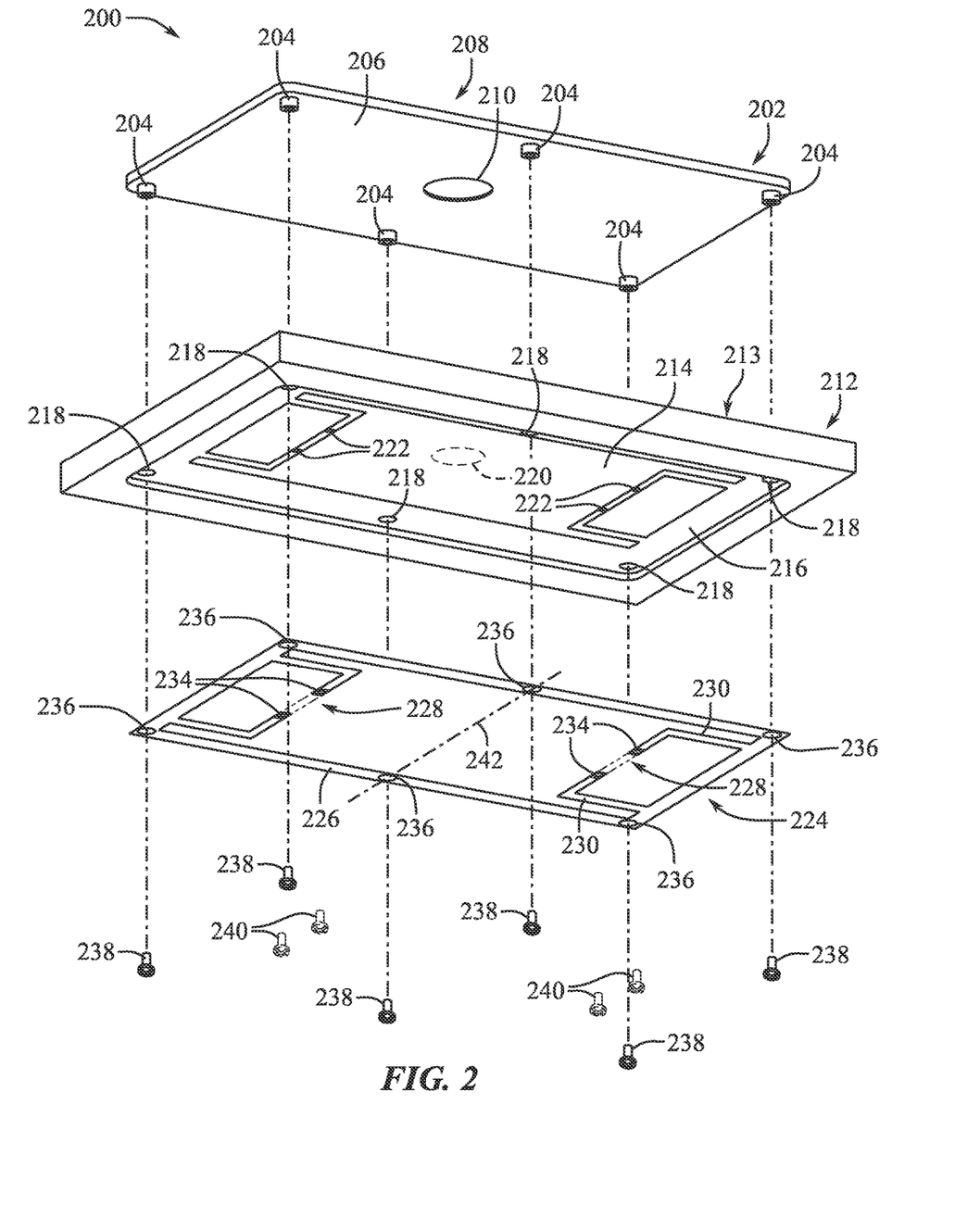
FIG. 2 illustrates an exploded view of an example trackpad assembly.

FIG. 2 illustrates an exploded view of a trackpad assembly 200 in accordance with one or more examples of the present disclosure. The trackpad assembly 200 can correspond to the trackpad 112 mentioned above in relation to the computing device 100 of FIG. 1. Alternatively, the trackpad assembly 200 can correspond to a different computing device, including a peripheral device (e.g., a standalone keyboard or a standalone trackpad).

In these or other examples, the trackpad assembly 200 can include a touch input plate 202. The touch input plate 202 can include a top panel or a first layer configured to receive a touch input from a user. In this regard, the touch input plate 202 can include a haptic layer that can receive touch (e.g., haptic) inputs, such as taps, swipes, pinches, clicks, presses, varying duration presses (e.g., long presses, short presses), similar inputs, or combinations thereof. In at least some examples, the touch input plate 202 can transfer energy from the touch input of a user so as to depress under the input load. In certain examples, the touch input plate 202 can move straight down (e.g., in response to a central input load from a user input). As referred to herein, the "down" direction (or "downward" direction) refers to a direction perpendicular to the top surface of the touch input plate 202 and directed longitudinally and vertically inward (i.e., within the enclosure 212 or toward the flexure 224). Similarly, the "up" direction (or "upward" direction) refers to a direction opposite the down direction, i.e., directed longitudinally and vertically outward and perpendicular to the top input surface of the touch input plate 202. In other examples, the touch input plate 202 can tilt or otherwise move in response to the touch input of a user (e.g., an off-centered touch input). Regardless, movement of the touch input plate 202 can, in turn, depress or collapse a switch positioned within one of a switch receptacle 210 formed in a bottom surface 206 of the touch input plate 202 or a switch receptacle 220 formed in a top surface of a base plate 212.

It will be appreciated that depression of a switch can trigger the transmission of one or more electrical signals (e.g., to a trackpad click controller unit for rendering a graphical representation). Additionally or alternatively, the touch input plate 202 can transmit electrical signals to a trackpad touch controller unit in response to sensing a change in capacitance caused by a touch input to (or near touch input at) a top surface 208 of the touch input plate 202 (e.g., based on detected changes in capacitance). In some embodiments, the trackpad can have a controller unit that receives and interprets clicks and touch input. In some examples, a keyboard housing is flush with the top surface 208 of the touch input plate 202.

Further shown, the touch input plate 202 can include stands 204 (e.g., standoffs, threaded receivers, receptacles, or attachment members) for engaging one or more fasteners (e.g., fasteners 238, screws, bolts, etc.). In some examples, the stands 204 are positioned around a perimeter of the bottom surface 206 of the touch input plate 202. In other examples, the stands 204 can be positioned differently (e.g., in non-perimeter positions and/or with different spatial arrangements). In either case, the stands 204 can connect a flexure 224 to the touch input plate 202 via the fasteners 238, as will be discussed in more detail below. Specifically, the stands 204 can extend from the bottom surface 206 to pass through holes 218 defined in the base plate 212. In certain cases, the stands 204 can extend downward from a bottom side surface 214 of the base plate 212 upon assembly. The flexure 224 can then connect to the touch input plate 202 via fasteners 238 that pass through holes 236 defined by the flexure 224 and join with the stands 204. In this manner, the flexure 224 can connect to the touch input plate 202 from beneath the bottom side 214 of the base plate 212, thereby sandwiching the base plate 212 between the touch input plate 202 and the flexure 224.

The trackpad assembly 200 can include the base plate 212 positioned below the touch input plate 202, as already mentioned. In more detail, however, the base plate 212 can include a housing, a housing panel, or an enclosure. In at least some examples, the base plate 212 comprises a frame or rigid structure (e.g., a metal structure). The base plate 212, in some embodiments, remains positionally fixed or constant (e.g., relative to a keyboard housing). In certain examples, the base plate 212 can thus be at least partially attached to the keyboard housing.

In addition, the base plate 212 can include a top surface 213 facing towards the bottom surface 206 of the touch input plate 202. The top surface 213 can be sized and shaped to receive the touch input plate 202 in various ways. In some examples, the top surface 213 is recessed so that (upon assembly with the touch input plate 202) the top-most surface 208 of the touch input plate 202 is flush (or substantially flush) with at least a portion (e.g., an outer, perimeter portion) of the top surface 213 of the base plate 212, thereby providing a substantially planar overall top surface of the assembly. In particular examples, the top surface 213 includes or supports one or more electronic components, such as a switch, PCB, etc. positioned thereon. In at least one example, the switch can reside within the switch receptacle 220 formed in the top surface 213.

The base plate 212 can also include the bottom side 214 that defines a recess 216. The recess 216 can include a groove, slot, channel, etc. that is sized and shaped to receive the flexure 224. The recess 216 can be sufficiently deep such that a portion of the flexure 224 positioned in the recess 216 can form a planar surface with the bottom side 214 of the base plate 212. In other examples, at least a portion of the flexure 224 extends beyond the recess 216 and the bottom side 214 of the base plate 212. Alternatively, in some examples, the recess 216 can be omitted. In such a case, an entirety of the flexure 224 is positioned below the bottom side 214 of the base plate 212.

The base plate 212 can further include holes 222 to engage fasteners 240 for constraining the flexure 224 to the base plate 212. In this manner, a portion of the flexure 224 (e.g., a first attachment portion 226) can be attached to the touch input plate 202 via the fasteners 238, and another portion of the flexure 224 (e.g., a second attachment portion 228) can be attached to the base plate 212 via fasteners 240.

Further shown in FIG. 2, the trackpad assembly 200 can include the flexure 224 positioned below the base plate 212 opposite the top surface 213 of the base plate 212. The flexure 224 can include a support, biasing member, elastic structure, spring (e.g., an extension spring or compression spring formed as a leaf spring, coil spring, similar structure, or combination thereof) to help impart an upward biasing force (e.g., a spring force, a compression contact, or a push-up abutment) to the touch input plate 202 relative to the base plate 212. In at least some examples, the flexure 224 includes portions that flex up and down with movement of the touch input plate 202. Additionally or alternatively, the flexure 224 can include portions that maintain a position of the touch input plate 202 in a resting state (e.g., in a raised or non-depressed position). Then, in response to downward travel of the touch input plate 202 (e.g., from a touch input applied to the top surface 208), the flexure 224 can include portions that deform, bend, rotate, translate, or otherwise movably resist the downward travel of the touch input plate 202.

The flexure 224 can provide its upward bias against the touch input plate 202 in various ways. In some examples, the flexure 224 can include a flexible material, a preformed bend or curvature, a shape memory material configured to return to a predetermined arrangement, a preloaded spring member, etc. In particular examples, the flexure 224 includes a combination of extending portions (e.g., lever arms) that contact the base plate 212 to impart a lever-like action relative to other portions connected to the touch input plate 202.

The flexure 224 can include a first attachment portion 226 for attaching to the touch input plate 202 via the fasteners 238 through holes 236 and holes 218 to engage the stands 204. The first attachment portion 226 can include segments, beam lengths, or portions of the flexure 224 that directly attach to the touch input plate 202 (albeit such portions can at times be in contact with the recess 216) via the fasteners 238. The first attachment portion 226 can include at least a partial outermost perimeter of the flexure 224. Additionally or alternatively, the first attachment portion 226 can include a frame portion, a skeletal portion, a support portion, a rigid portion, a touch input plate attachment portion, etc. In these or other examples, the first attachment portion 226 can positionally move relative to the bottom side 214 of the base plate 212 (e.g., as the first attachment portion 226 moves with the touch input plate 202). The first attachment portion 226 can comprise a generally rectangular shape having corners defined by the four corner openings 236. The rectangular shape can include two elongated sides which are elongated relative to the shorter sides. At least one second attachment portion 228 can be positioned inward from one of the shorter sides of the first attachment portion 226. In the embodiment of FIG. 2, two second attachment portions 228 are shown, with each one being positioned inward from an opposite short side of the first attachment portion 226.

Figure 3:
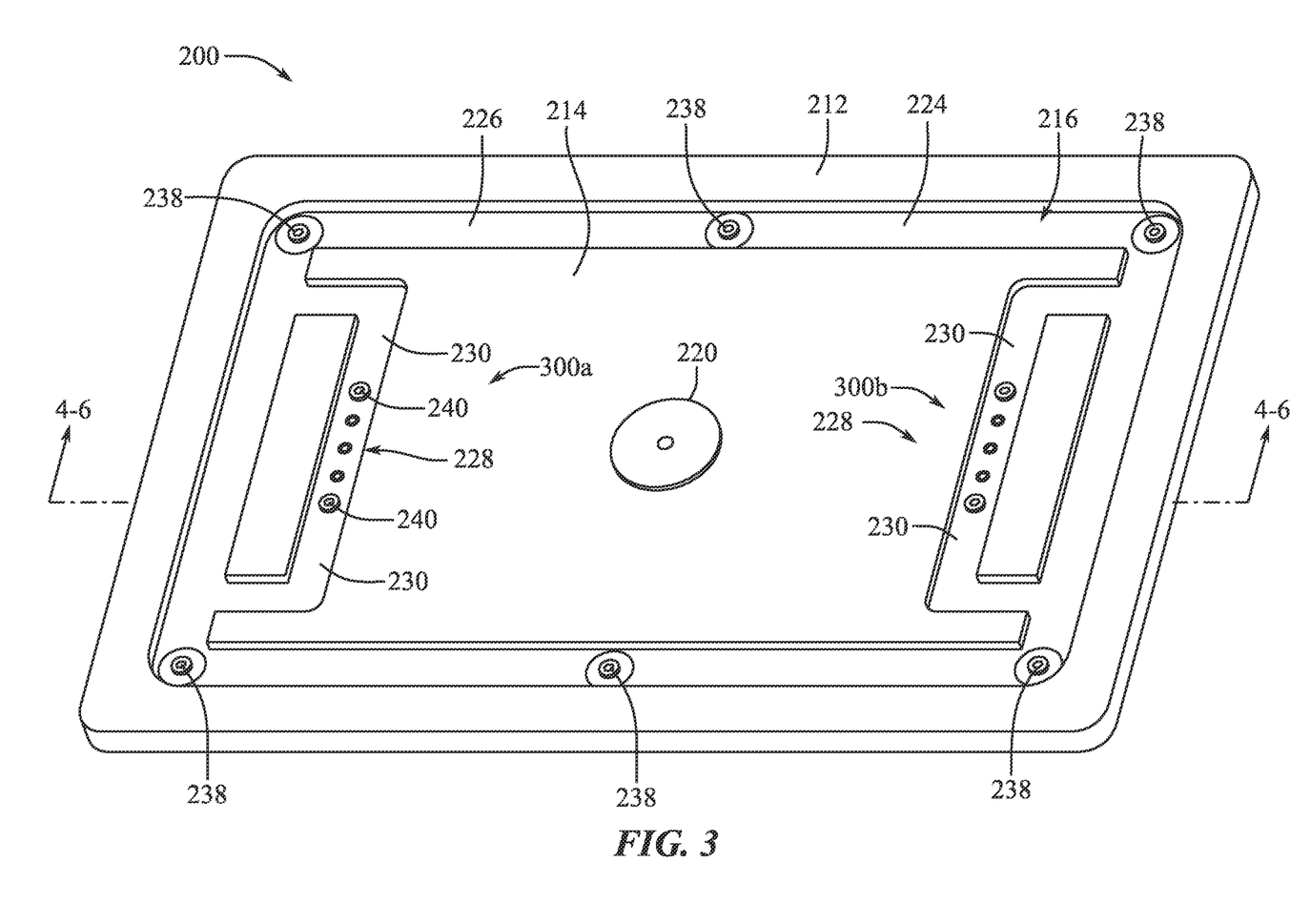
FIG. 3 illustrates an assembled, bottom perspective view of an example trackpad assembly.

Further, the second attachment portions 228 may be used for attaching the flexure 224 to the base plate 212 via the central or base plate fasteners 240 through holes 234 in the second attachment portions 228 and holes 222 to engage the body of the base plate 212. The second attachment portions 228 can specifically include segments, beam lengths, or portions of the flexure 224 that attach to the base plate 212. Segments of the second attachment portions 228 can include support portions, lateral portions, hooking portions, stiff portions, connecting portions, etc. that can contact and join the flexure 224 to the bottom side 214 of the base plate 212. The second attachment portions 228 can be positioned inside the first attachment portion 226. In other examples, however, the second attachment portion 228 can be positioned in different configurations, such as outside the first attachment portion 226 (see FIGS. 9-11). In FIG. 2, the second attachment portions 228 are shown in broken lines. In some examples, and as shown in FIGS. 2 and 3, the second attachment portions 228 are contiguous with one or more flexible portions 230 that link the second attachment portions 228 to the first attachment portion 226, as further described below. In some examples, the second attachment portion 228 can be an assembly of a central segment (shown in broken lines in FIG. 2) that is directly attached to separate flexible portions 230, such as a segment that at least partially overlaps and connects to end pieces of the flexible portions 230.

Figure 7:
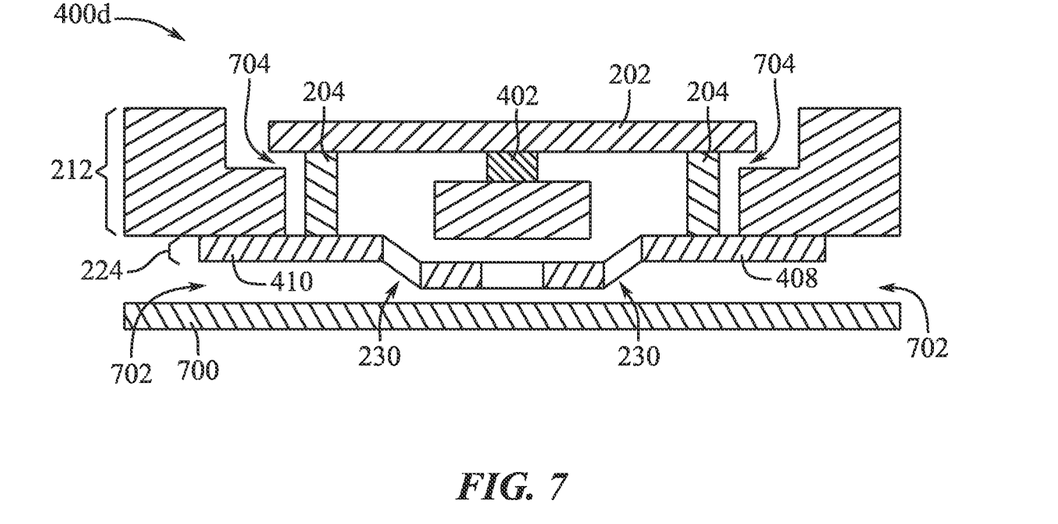

In addition, the flexure 224 can include at least one flexible portion (e.g., flexible portions 230 in FIGS. 2 and 3) connecting the first attachment portion 226 and the second attachment portion 228. The flexible portions 230 can act as connecting arms or members that flexibly transition the flexure 224 between the first attachment portion 226 and the second attachment portion 228. In particular examples, the flexible portions 230 can bias the first attachment portion 226 upward relative to the second attachment portion 228. That is, the flexible beams of the flexible portions 230 can cause the first attachment portion 226 to push upward against the touch input plate 202 relative to the base plate 212. To do so, the flexible portions 230 can include segments of the flexure 224 that can deform, bend, rotate, translate, etc. against a predetermined bias provided by a preformed bend (e.g., an angled or non-planar section, as indicated in FIG. 7), a shape or curvature in the flexure 224, a material/fiber orientation, or a shape memory configuration.

In these or other examples, the flexible portions 230 can include one or more sets of flexible beams. As used herein, the term "set" or "sets," when referring to the flexible beams, should be interpreted broadly to include any grouping, collection, or organization of multiple flexible beams. The sets of flexible beams can be any number or plurality of flexible beams arranged in many different ways (e.g., as demonstrated in FIGS. 12A-12H). In at least one example, the flexible portions 230 can be arranged symmetrically relative to a centerline 242 of the flexure 224. See FIG. 2. The symmetry can provide a more consistent feedback response or location-agnostic click ratio for touch inputs at the top surface 208. Additionally or alternatively, in some examples, the flexible portions 230 can be dimensionally isometric relative to each other (e.g., where segments of the flexible portions 230 are equivalent in terms of one or more of length, width, or height).

Any of the features, components, parts, including the arrangements and configurations thereof shown in FIG. 2 can be included, either alone or in any combination, in any of the other examples of devices, features, components, and parts shown in the other figures. Likewise, any of the features, components, parts, including the arrangements and configurations thereof shown in the other figures can be included, either alone or in any combination, in the example of the devices, features, components, and parts shown in FIG. 2.

FIG. 3 illustrates an assembled, bottom perspective view of the trackpad assembly 200 in accordance with one or more examples of the present disclosure. In particular, FIG. 3 illustrates an example configuration of the flexible portions 230 and the second attachment portion 228 arranged inside the inner perimeter of the first attachment portion 226. Such a configuration can be referred to as a "beam-in" configuration because the flexible beams of the flexible portions 230 are positioned within an interior portion of the assembly (i.e., inside the perimeter of the first attachment portion 226). In other embodiments, the trackpad assembly of the present disclosure has other configurations, such as a "beam-out" configuration (see FIGS. 9-11).

FIG. 3 illustrates an example configuration of the flexure 224 comprising a first spring beam 300a and a second spring beam 300b. In this embodiment, the spring beams 300a, 300b each include a pair of L-shaped flexible portions 230 and a second attachment portion 228 positioned between the ends of the L-shapes, and the flexible portions 230 and second attachment portion 228 all form a continuous U-shaped spring beam that is integrated with the first attachment portion 226. Fasteners 240 (e.g., screws or rivets) extend through the spring beams 300a, 300b to retain them to the base plate 212. Additionally or alternatively, welds, adhesives, similar attachment devices, or combinations thereof can be used. The flexure 224 can, in various embodiments, include more or fewer spring beams. In these or other examples, the flexible portions 230 can flex toward and away from the downward- or bottom-facing surface of the recess 224 of the base plate 212, while the second attachment portion 228 in each of the first and second spring beams 300a-300b are stationary relative to the base plate 212. Thus, by being anchored to the base plate 212 via the second attachment portion 228, the flexible portions 230 can use the points of attachment (at the location of the fasteners 240) to resist downward movements of the touch input plate 202. For instance, the flexible portions 230 can flexibly deform in the direction opposite of a predetermined bias or bend (e.g., in a downward direction away from the base plate 212 based on a touch input to the touch input plate 202 causing at least part of the first attachment portion 226 to translate downward). Then, the flexible portions 230 can spring back (using the second attachment portion 228 anchored in place as leverage) to return the first attachment portion 226 (and hence the touch input plate 202) to a resting position.

In addition, the first and second spring beams 300a-300b can have a variety of shapes and sizes. As depicted in FIG. 3, the first and second spring beams 300a-300b are arranged in a U-shape configuration, with the respective troughs of the "U" (i.e., the closed ends of the U-shapes) being positioned closest to the middle of the trackpad assembly 200 (i.e., extending through receptacle 220).

Similarly, the flexure 224 as a whole can include a variety of shapes and sizes. For example, the first attachment portion 226 can form a rectangular frame connecting the first spring beam 300a and the second spring beam 300b. In other examples, however, the first attachment portion 226 can form a different-shaped frame (e.g., a square frame, an oval frame, a polygonal frame) connecting the first spring beam 300a and the second spring beam 300b. The outer perimeter of the first attachment portion 226 can be configured to follow or mirror the outer perimeter of the touch input plate 202.

Any of the features, components, and parts, including the arrangements and configurations thereof shown in FIG. 3 can be included, either alone or in any combination, in any of the other examples of devices, features, components, and parts shown in the other figures. Likewise, any of the features, components, parts, including the arrangements and configurations thereof shown in the other figures can be included, either alone or in any combination, in the example of the devices, features, components, and parts shown in FIG. 3.

FIGS. 4-7 illustrate example schematic cross-sectional side views of a portion of a trackpad assembly in accordance with one or more examples of the present disclosure, as indicated by cross-section indicator 4-6 in FIG. 3. However, being schematic in nature, the elements arranged in FIGS. 4-7 are not shown to scale or intended to spatially align or pictorially conform to all aspects shown in FIG. 3. Thus, FIGS. 4-7 are provided for explanation purposes.

Figure 4:
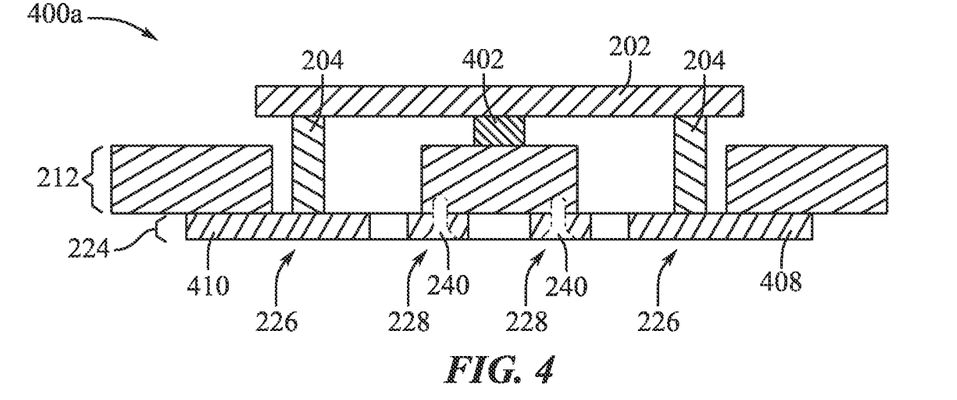
FIGS. 4-7 illustrate example schematic cross-sectional side views of a portion of a trackpad assembly.

In particular, FIG. 4 illustrates a cross-section 400a with a portion of a trackpad assembly in an assembled configuration with the flexure 224 positioned in flattened state when the touch input plate 202 is at rest (i.e., no load or touch input is applied at the touch input plate 202). In the flattened state, a bottom portion (e.g., at the second attachment portion 228) of the preformed bend (extending across the flexible portions 230, as illustrated by comparing FIGS. 4 and 7) can be biased upward toward the base plate 212 and secured thereto. Additionally or alternatively for the flattened state shown in FIG. 4, lateral portions 408 and 410 of the flexure 224 can be biased downward (against the preformed upward bias of the lateral portions 408-410) until flattened, and the base plate 212 can be positioned in direct, abutting contact with the lateral portions 408, 410. The lateral portions 408, 410, as discussed below, can include portions of the flexure 224 that extend beneath outer portions of the base plate 212.

As shown in FIG. 4, the flexure 224 can be attached to the touch input plate 202 and to the base plate 212. Specifically, fasteners 238 can peripherally attach the flexure 224 to the stands 204 to directly couple the flexure 224 to the touch input plate 202. In this manner, the flexure 224 can provide an upward bias to the touch input plate 202. In addition, the fasteners 240 can centrally attach the flexure 224 to the base plate 212. Accordingly, the flexure 224 can deflect (e.g., in tandem) with movement of the touch input plate 202, while remaining partially anchored to (e.g., leveraged against) the base plate 212.

In addition, cross-section 400a includes a schematic switch 402 positioned between the touch input plate 202 and the base plate 212. As depicted in the cross-section 400a, the switch 402 is uncollapsed (or otherwise untriggered) because the touch input plate 202 is at rest and has not been depressed to cause the switch 402 to collapse. The switch 402 can include a collapsible dome switch, a mechanical switch, or other electrical switch configured to trigger or complete an electrical connection in response to a predetermined amount of downward deflection of the touch input plate 202. For example, the switch 402 can be compressed or collapsed, thereby making or completing an electrical connection that is recognizable by a touchpad or computer controller, upon application of a downward force 404 on the touch input plate 202. The switch 402 may be positioned in one of the switch receptacles 210, 220.

Figure 5:
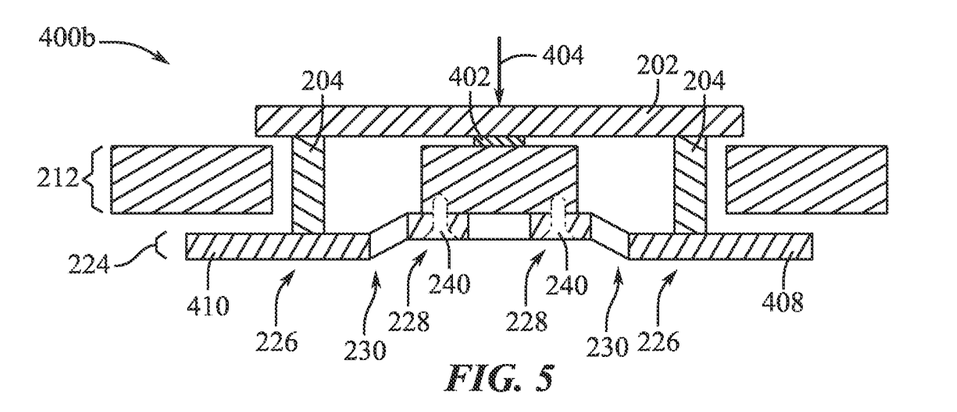
Figure 6:
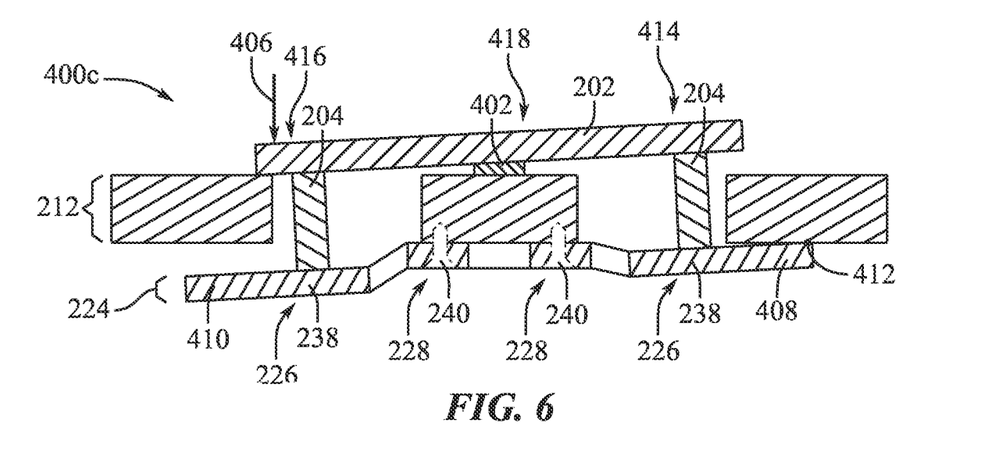

Referring now to FIGS. 5-6, the flexure 224 is shown in example flexed states. The flexure 224 can move to a flexed state shown in FIG. 5 in response to an applied load 404 (e.g., a touch input) to the touch input plate 202. In these or other examples, the term "flexed state" refers to a non-rest positioning of the flexure 224. For example, a flexed state can include a flexure positioning in which the flexure 224 is bowed, flexed, tilted, bent, etc. in response to an applied load (e.g., a touch input load). In a flexed state, the flexure 224 can be positionally disturbed away from a resting position, e.g., the state shown in FIG. 4. Further, it will be appreciated that the flexure 224 being positionable to a flexed state does not exclude the flexure 224 from having internal forces or stresses when the flexure 224 is in a resting state. Indeed, as discussed above, portions of the flexure 224 can be biased, bowed, bent, or flexed to reside in the resting state shown in FIG. 4.

FIG. 5 illustrates a cross-section 400b depicting a central input load 404 being applied to the touch input plate 202. The central input load 404 can correspond to a user input touch applied at or near a middle region of the touch input plate 202. In response to the central input load 404, the touch input plate 202 can move toward the base plate 212 and depress the switch 402 (thereby triggering transmission of a corresponding electrical signal from or through the switch 402).

In addition to depressing the switch 402 and translating down toward the base plate 212, the touch input plate 202 can cause at least a portion of the flexure 224 to bend, flex, pivot, rotate, translate, etc. In particular examples, the portions of the flexure 224 (e.g., the first attachment portion 226 or corresponding frame member) connected to the touch input plate 202 via the fasteners 238 and the stands 204 can also move with the touch input plate 202. It will be appreciated that such downward motion of the first attachment portion 226 can be relative to the base plate 212 (which is positionally fixed or stationary). Additionally or alternatively, the downward motion of the first attachment portion 226 to the flexed state can be relative to one or more stationary portions of the flexure 224 (e.g., the second attachment portion 228 connected to the base plate 212 via the fasteners 240).

Further, the lateral portions 408, 410 can also translate downward with depression of the touch input plate 202. In some examples, based on the position of application of the central input load 404 relative to the center of the touch input plate 202, the lateral portions 408, 410 and/or the first attachment portion 226 can translate downward an approximately equivalent distance. In certain instances, the lateral portions 408, 410 are pushed, bent, flexed, or otherwise moved against an upward bias of the lateral portions 408, 410. For instance, as will be described more below in relation to FIG. 7, the lateral portions 408, 410 (and/or certain portions of the first attachment portion 226) can be pre-formed with an upward bias relative to the second attachment portion 228. Thus, in response to depression of the touch input plate 202, the lateral portions 408, 410 (and/or certain portions of the first attachment portion 226) can be bowed, moved, or flexed in an opposite direction relative to the pre-formed upward bias. In this manner, first and second lateral portions (e.g., the lateral portions 408, 410) can both move away from the bottom side of the base plate 212 in response to the central input load 404. In this flexed state, the flexure 224 can form a convex surface facing the base plate 212 due to the lateral portions 408, 410 (and one or more segments of the first attachment portion 226) being positioned lower than the second attachment portion 228.

Additionally, flexible portions 230 of the flexure 224 between the fasteners 238 and the fasteners 240 can also bend, flex, pivot, rotate, translate, etc. For instance, the flexible portions 230 can bend away from the base plate 212 to accommodate the downward translation of the first attachment portion 226 and lateral portions 408, 410, while still rigidly connected at another end of the flexible portion 230 (i.e., at the second attachment portion 228) where the fastener 240 connects the flexure 224 to the base plate 212. That is, the second attachment portion 228 can be positioned stationary relative to the movable first attachment portion 226 in response to the central input load 404. As a result, the flexible portions 230 can flexibly transition the flexure 224 between stationary and dynamic portions of the flexure 224. Moreover, the flexible portions 230 can provide a return bias to the first attachment portion 226 so that the flexure 224 returns to its flattened state shown in FIG. 4 upon removal of the central input load 404.

FIG. 6 illustrates a cross-section 400c depicting an off-center input load 406 being applied to the touch input plate 202. The off-center input load 406 can correspond to a user input touch applied away from a middle region of the touch input plate 202 (e.g., at a corner region or an intermediate position between a center region and the corner region). In response to the off-center input load 406, the touch input plate 202 can move downward toward the base plate 212 and depress the switch 402 (thereby triggering transmission of a corresponding electrical signal from the switch 402). However, unlike the central input load 404 shown in FIG. 5, the off-center input load 406 can cause the touch input plate 202 to proceed downward in a tilting fashion. Specifically, the touch input plate 202 can rotate about an axis 412 extending (e.g., perpendicularly to the page) through the lateral portion 408 of the flexure 224. As the touch input plate 202 rotates or pivots downward in this manner, the touch input plate 202 can correspondingly depress the switch 402.

FIG. 6, the cross-section 400c illustrates some differences from the cross-section 400b of FIG. 5. In particular embodiments, the lateral portion 408 at the opposite end of the touch input plate 202 relative to the off-center input load 406 can provide a stopping effect or hooking action in response to the off-center input load 406. Specifically, the lateral portion 408 can contact the bottom side of the base plate 212 to function as a mechanical stop. The base plate 212 can interfere with the lateral portion 408 extending underneath and overlapping the bottom side of the base plate 212. Thus, the base plate 212 and the lateral portion 408 can bound an upward tilt or translation of the touch input plate 202 such that a portion 414 of the touch input plate 202 opposite the off-center input load 406 does not pop up or out of plane (e.g., by remaining substantially at its resting height relative to the base plate 212) even though the opposite end, where the input load 406 is applied, can tilt and rotate downward. Additionally, by bounding the upward tilt or translation of the touch input plate 202, the first lateral portion can induce the pivot motion of the touch input plate 202 about the axis 412. In at least some examples, the first lateral portion can also lend to an improved tactile response by reducing trackpad slop and inducing a smooth tilting action, including at an area of the touch input plate 202 opposite the off-center input load 406.

By contrast, the second lateral portion 410 corresponding to a same side as the off-center input load 406 can move away from the bottom side of the base plate 212, similar to the downward travel shown in FIG. 5. However, unlike the downward travel responsive to the central input load 404 in FIG. 5, in some embodiments the second lateral portion 410 (and associated segments of the first attachment portion 226) can travel even farther downward (relative to the base plate 212) for the off-center input load 406. Additionally, in some examples, portions of the touch input plate 202 can also travel farther downward in response to the off-center input load 406 compared to the central input load 404. For instance, in response to the off-center input load 406, a corner portion 416 of the touch input plate 202 corresponding to the off-center input load 406 can travel a distance that is double an amount of travel for a center region 418 of the touch input plate 202. Particular aspects of travel, force, and click ratio are discussed further below in relation to FIG. 8.

Additionally, in some examples, such as shown in FIG. 6, the corner portion 416 of the touch input plate 202 corresponding to the off-center input load 406 can travel downward and contact a top surface of the base plate 212, thereby preventing any further downward travel of the touch input plate 202. In other examples, however, the base plate 212 does not stop the touch input plate 202, and the touch input plate 202 may have its downward movement limited upon reaching a maximum elastic deflection of the flexible portion 230 or upon the flexure 224 coming into contact with a hard stop surface below the flexure 224 (e.g., plate 700 shown in FIG. 7).

FIG. 7 illustrates yet another schematic cross-section 400d in accordance with one or more examples of the present disclosure. Like in FIG. 4, there is no applied load. The cross-section 400d illustrates an unassembled (or pre-assembled) view without fasteners, adhesive, or other connective features between the base plate 212 and the flexure 224. From this view, the cross-section 400d depicts the flexure 224 comprising a preformed bend at the flexible portions 230. In particular, the preformed bend at the flexible portions 230 can include an upward bend such that one or more portions of the first attachment portion 226 and the lateral portions 408, 410 are positioned higher than the second attachment portion 228 before final assembly to the base plate 212. In other words, in an unassembled state, the flexure 224 can include a concave surface that faces the bottom side of the base plate 212. In this way, the flexure 224 can provide a biasing effect as described above (e.g., to provide an upward bias against the touch input plate 202, but from underneath the base plate 212). After attachment of the flexure 224 to the base plate 212 (e.g., via fasteners 240), the second flexible portion(s) 228 of the flexure 224 may contact the bottom of the base plate 212, as shown in FIG. 4, and the flexible portions 230 may be preloaded in a manner providing the upward bias. Additional or alternative biasing bends, curvature, etc. may be implemented in one or more other embodiments.

FIG. 7 also shows a bottom base plate 700 (also referred to as a bottom housing panel). The bottom base plate 700 can, like the base plate 212, help define the metes and bounds of a trackpad opening within a keyboard housing. Additionally or alternatively, the bottom base plate 700 can define the bottom or lower outer enclosure of a standalone trackpad. Further, in some embodiments, the bottom base plate 700 can be part of the base plate 212 or connected to the base plate 212 via fasteners, adhesive, etc. In particular implementations, the base plate 700 is integrally formed with or integrally attached to base plate 212 (e.g., as a single housing piece). It will also be appreciated that, in some embodiments, the bottom base plate 700 can provide a mechanical stop to the flexure 224 in response to a touch input load at the touch input plate 202.

In some examples, the space between the bottom surface of the flexure 224 and the top surface of the plate 700 corresponds to a depression space 702. As used herein, the term "depression space" refers to a void or empty space with metes and bounds defined by adjacent elements, such as the flexure 224 and the plate 700. A depression space can be sized and shaped to receive moving components, such as movable trackpad components that flex or move in response to user input. Accordingly, a depression space can be filled, at least temporarily during application of a user input to the touch input plate 202, with one or more moving components.

Similarly, as shown in FIG. 7, the space between the bottom surface of the touch input plate 202 and a recessed surface (or stopping surface) of the base plate 212 corresponds to a depression space 704. As will be discussed below in relation to FIGS. 9-11, the depression space 704 can be omitted for a thinner profile trackpad assembly.

Any of the features, components, parts, including the arrangements and configurations thereof shown in FIGS. 4-7 can be included, either alone or in any combination, in any of the other examples of devices, features, components, and parts shown in the other figures. Likewise, any of the features, components, parts, including the arrangements and configurations thereof shown in the other figures can be included, either alone or in any combination, in the example of the devices, features, components, and parts shown in FIGS. 4-7.

Figure 8:
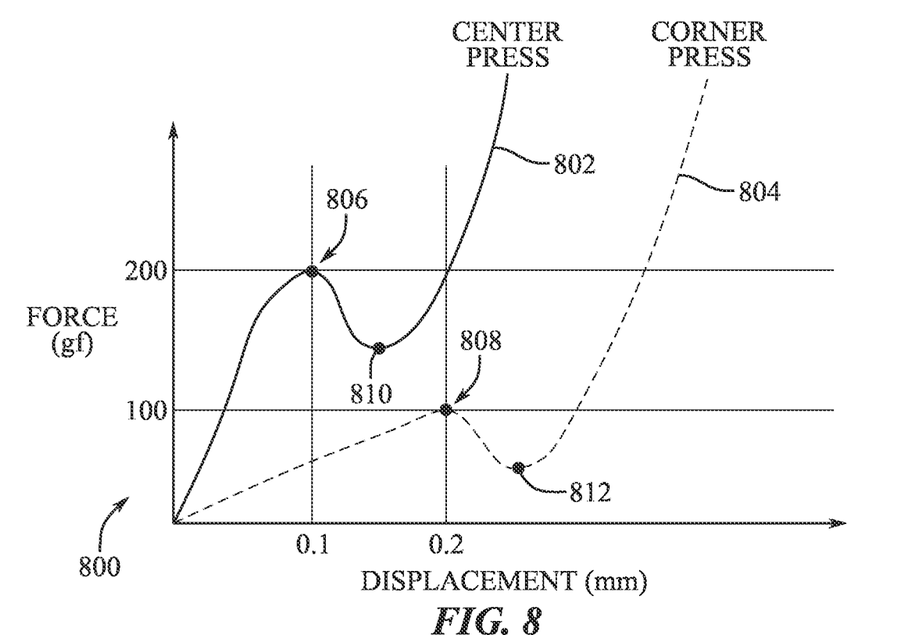
FIG. 8 illustrates a graph that includes experimental results of force-displacement curves based on one or more implementations of the present disclosure.

FIG. 8 illustrates a graph 800 of the force-displacement behavior of embodiments of the present disclosure caused by a flexure (e.g., 224) and switch (e.g., 402). The graph 800 generally represents the amount of force to depress (e.g., apply a click or other touch input to) a trackpad assembly of the present disclosure and the corresponding top-surface displacement at the location of input. In particular, the graph 800 includes a first force-displacement curve 802 for a center press (e.g., the central input load 404 shown in FIG. 5), and a second force-displacement curve 804 for a corner press (e.g., the off-center input load 406 shown in FIG. 6).

As shown, the first force-displacement curve 802 indicates a first peak force (e.g., a first local maxima of force to begin collapsing a switch) at about 200 gram-force for graph coordinate 806. At the graph coordinate 806, the first force-displacement curve 802 indicates displacement of 0.1 millimeters. By contrast, the second force-displacement curve 804 indicates a first peak force (e.g., a first local maxima of force to begin collapsing a switch) at about 100 gram-force for graph coordinate 808. At the graph coordinate 808, the second force-displacement curve 804 indicates displacement of 0.2 millimeters.

The graph 800 indicates an example force-displacement relationship for one or more embodiments of the present disclosure. In particular, a corner region of the trackpad surface of the present disclosure can travel approximately twice the distance as the center of the trackpad surface. In addition, a corner region of the trackpad surface can undergo such travel for half the amount of force. In some examples, the amount of work (i.e., force times distance) to achieve the first peak force is approximately the same, regardless of where the input is applied across the trackpad surface.

In a similar vein, a click ratio for depressing the switch can be the same irrespective of a location of an input load applied at the trackpad surface (e.g., the touch input plate 202 or top panel discussed above in relation to the foregoing figures). As used herein, a "click ratio" refers to the ratio of peak deflection (e.g., at 806) to the tactile drop in force (e.g., to 810) on a force-displacement curve (e.g., 802). In other terms, a click ratio is generally defined as the maximum load (e.g., at graph coordinates 806, 808) minus the local minimum load (e.g., at graph coordinates 810, 812) normalized by the maximum load of the load profile resulting from an actuation of a switch. Typically, higher click ratios (e.g., 40% and above) can provide increased or better-feeling tactile responses to users. In this case, the graph 800 indicates that the trackpad of the present disclosure can provide click ratios of about 50%. Moreover, the graph 800 indicates that the click ratio (of about 50%) is approximately the same, regardless of where the input is applied across the trackpad surface.

Any of the features, components, parts, including the arrangements and configurations thereof shown in FIG. 8 can be included, either alone or in any combination, in any of the other examples of devices, features, components, and parts shown in the other figures. Likewise, any of the features, components, parts, including the arrangements and configurations thereof shown in the other figures can be included, either alone or in any combination, in the example of the devices, features, components, and parts shown in FIG. 8.

Figure 9:
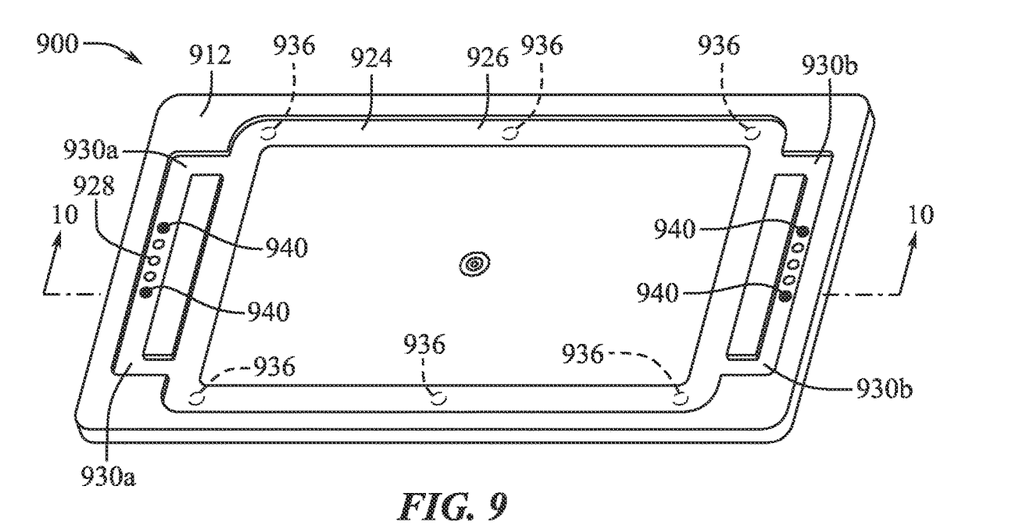
FIG. 9 illustrates an assembled, bottom perspective view of another example trackpad assembly.
Figure 10:
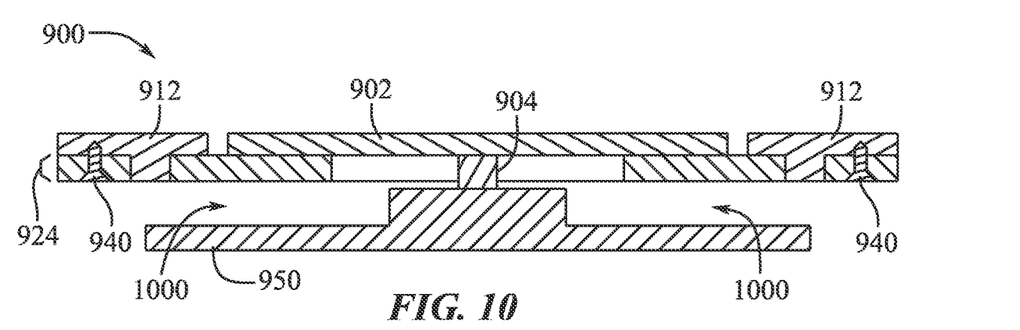
FIGS. 10-11 respectively illustrate schematic side view cross-sections of a trackpad assembly in resting and flexed states.
Figure 11:
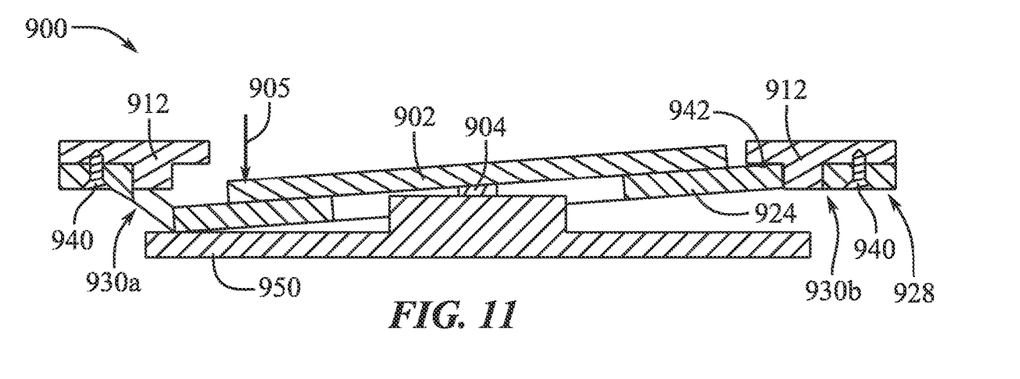

FIGS. 9-11 illustrate another example embodiment of a trackpad assembly in accordance with one or more examples of the present disclosure. In particular, FIGS. 9-11 respectively illustrate an assembled, bottom perspective view of a trackpad assembly 900 and a schematic side view cross-sections of the trackpad assembly in resting and flexed states. The trackpad assembly 900 can include the same or similar elements as discussed above. For example, the trackpad assembly 900 can include a touch input plate 902, a switch 904, a base plate 912, a flexure 924 positioned on or within a bottom surface of the base plate 912 (e.g., along a channel formed in the bottom surface of the base plate 912), various fasteners (e.g., fasteners 940 or optional fasteners 936), and a bottom base plate 950 positioned below the flexure 924. The bottom base plate 950 (also referred to as a bottom housing panel similar to the bottom base plate 700 discussed above) can include a top surface that faces the bottom surface of the flexure 924. The flexure 924 can also include flexible portions 930a, 930b that can bias the flexure 924 in one or more predetermined ways. For instance, the flexible portions 930a, 930b can flexibly transition the flexure 924 between the first attachment portion 926 and the second attachment portion 928 and help return the flexure 924 to a resting state (shown in FIG. 10) from a flexed state (shown by way of example in FIG. 11), as described above in relation to foregoing figures. Additionally or alternatively, the flexible portions 930a-930b can positionally bias the touch input plate 902 upward (e.g., to be approximately planar with the base plate 912).

Additionally, the trackpad assembly 900 includes a different configuration of one or more of the foregoing components. Specifically, FIGS. 9-11 illustrate an example configuration of a pair of flexible portions 930a-930b (each having a second attachment portion (e.g., 928)) arranged laterally outside the perimeter of the first attachment portion 926. Such a configuration can be referred to as a "beam-out" configuration because the flexible beams of the flexible portions 903a-930b are positioned outside an interior portion of the assembly (i.e., outside the perimeter of the first attachment portion 926). The trackpad assembly 900 is thus distinguished from the example "beam-in" configuration discussed above in relation to previous figures. It will therefore be appreciated that the flexible beams disclosed herein can be modified to many different positions and configurations to obtain a desired tactile response, click ratio, etc.

The trackpad assemblies can also provide other benefits in addition to improved tactile response or click ratio. For example, the trackpad assembly 900 can help provide a consolidated, thinner, or more flattened profile as compared to the embodiment of assembly 200. By lowering the height profile and required space, the trackpad assembly 900 can potentially be implemented in comparatively thin, sleek, and highly portable electronic devices. Additionally or alternatively, the trackpad assembly 900 may provide weight savings for improved lightness and portability.

In these or other examples, the base plate 912 can be arranged laterally surrounding and laterally outward relative to the outer perimeter of the touch input plate 902. In some cases, one or more surfaces of the base plate 912 are flush with a surface of the touch input plate 902. In other words, a top surface of the base plate 912 and a top surface of the touch input plate 902 can be flush with each other. As another example, a bottom surface (i.e., a flexure mounting surface) of the base plate 912 can be flush with the bottom surface of the touch input plate 902. By shifting the base plate 912 outward in this manner, the trackpad assembly 900 can therefore lower the overall height profile of the assembly 900 as discussed above. Specifically, as compared to FIGS. 4-7, the trackpad assembly 900 includes no depression space 704 between the base plate 912 and the touch input plate 902. Rather, the trackpad assembly 900 can include a sole depression space 1000. The sole depression space 1000 is the same as or similar to the depression space 720 discussed above in relation to FIG. 7. Specifically, the sole (e.g., single) depression space 1000 is defined between the bottom surface of the flexure 924 and the top surface of the bottom base plate 950. Such a sole depression space can be sized and shaped to receive moving portions of the trackpad assembly (particularly the flexure 924) in response to at least one of an off-center input load or the central input load applied at the top surface of the touch input plate 902.

In some examples, the flexure 924 can include a top surface in contact with a bottom surface of the base plate 912 and with a bottom surface of the touch input plate 902. This configuration of the flexure 924 can also lend to a thinner profile as mentioned above, for instance, by being positionable up against both of the base plate 912 and the touch input plate 902 without needing spacers or stands (e.g., 204), as shown in the resting state of FIG. 10.

As shown in FIG. 11, the flexure 924 can move to a flexed state in response to an off-center input load 905 applied to the touch input plate 902. The touch input plate 902 can move downward where the force 905 is applied, thereby depressing the switch 904. Additionally, as the touch input plate 902 moves downward, the touch input plate 902 causes the flexible portion 930a and/or 940b to flex to accommodate the downward movement of the first attachment portion 926 relative to the second attachment portion 928 fixed in place. As the flexible portion 930a flexes, a return bias of the flexible portion 930 (e.g., a spring force) can increase to induce movement of the flexure 924 back to the resting state of FIG. 10, as similarly described above in relation to the foregoing figures.

In the example of FIG. 11, the flexible portion 930b and the second attachment portion 928 on the right-hand side can work together to assist preventing the right side of the touch input plate 902 from moving upward relative to the base plate 912. To illustrate, the second attachment portion 928 (attached to the base plate 912) and the flexible portion 930b help positionally anchor the first attachment portion 926 (attached to the touch input plate 902) when the force 905 is applied at an opposite side of the touch input plate 902.

This anchoring effect is also referred to as a hooking effect, in which the lateral portion of the flexure 924 "hooks" onto the base plate 912 to leverage a counteracting force (e.g., at a location 942) against the upward rising of the right-hand side of the touch input plate 902. Additionally, at the location 942, the flexure 924 can pivot. Specifically, to the right of the location 942, the flexure 924 can contact the base 912 as part of the hooking action that resists upward motion of the right-hand side of the touch input plate 902. Then, to the left of the location 942, the flexure 924 can tilt downward (together with the touch input plate 902) in response to the force 905. It will be appreciated that the location 942 along the flexure 924 can vary depending on the geometry of the base 912 positioned above the flexure 924 (as well as the placement of the force 905). For instance, in moving the force 905 more to the right (but still left of the switch 904), the location 942 can also move farther to the right as more of the flexure 924 on the right-hand side displaces downward. Likewise, moving the force 905 a little more to the left can cause the location 942 to similarly shift a little to the left (where the left-most position of the location 942 can correspond to the inner-most portion of the base 912 on the right-hand side shown in the cross-section of this figure).

The foregoing hooking action of the flexure 924 can also facilitate actuation of the switch 904 (where otherwise the switch 904 may remain unactuated if the touch input plate 902 were allowed to shift upward out of plane during the responsive tilting of the touch input plate 902). Additionally, the foregoing hooking action of the flexure 924 can lend to the haptic clicking effect felt by the user as the switch 904 is actuated.

Any of the features, components, parts, including the arrangements and configurations thereof shown in FIGS. 9-11 can be included, either alone or in any combination, in any of the other examples of devices, features, components, and parts shown in the other figures. Likewise, any of the features, components, parts, including the arrangements and configurations thereof shown in the other figures can be included, either alone or in any combination, in the example of the devices, features, components, and parts shown in FIGS. 9-11.

FIGS. 12A-12H respectively illustrate example flexures 1200a-1200h in accordance with one or more examples of the present disclosure. As shown, the flexures 1200a-1200h include different variations of flexible portions. These different variations can be implemented to provide different tactile responses (e.g., to achieve different spring back forces and/or locational tactile properties), click ratios, trackpad height profiles, etc.

Figures 12A, 12B, 12C, 12D, 12E, 12F, 12G, 12H:
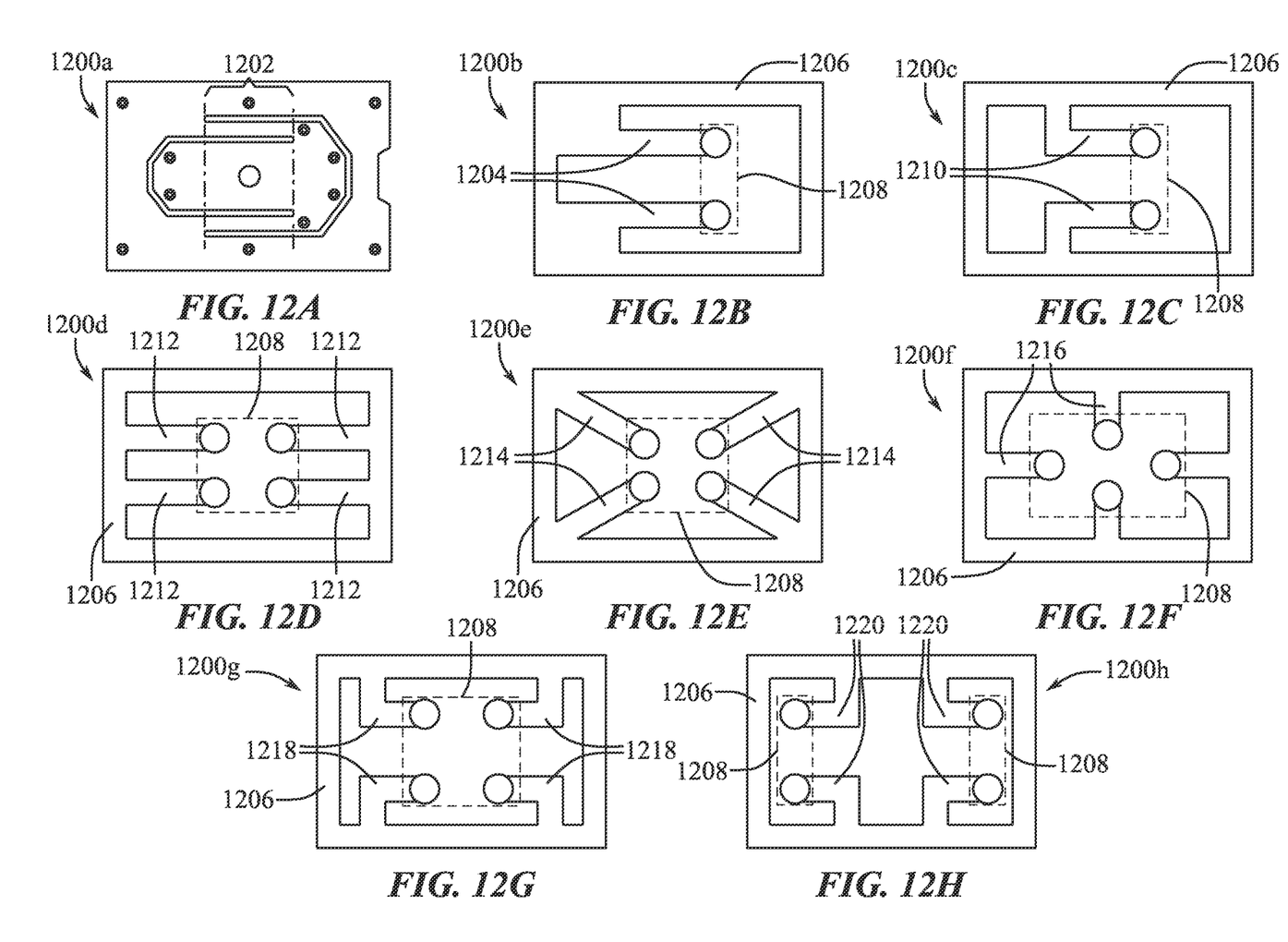
FIGS. 12A-12H each illustrate example embodiments of flexures for touch input support mechanisms.

In FIG. 12A, the flexure 1200a includes a flexible portion 1202 with alternately facing beams or sections. In some examples, the flexure 1200a includes a substantially solid plate with cutouts to define movable sections.

Compared to the flexure 1200a, the flexures 1200b-1200h include less material with more cutouts. The flexures 1200b-1200h specifically include flexible beams adjacent to cored out regions of the flexure. The flexible beams in these examples are spaced apart (e.g., symmetrically spaced) and positioned inside a frame member 1206. The frame member 1206 can include an attachment portion configured to attach to a touch input plate (as described above). However, as described in relation to FIGS. 9-11, the flexible beams in FIGS. 12B-12H need not be positioned inside the frame member 1206. Further, in some examples, the flexible portions in FIGS. 12B-12H can optionally include an attachment portion 1208 (e.g., a stationary plate) that connects two or more of the flexible portions together. Additionally or alternatively, the attachment portion 1208 can affix the flexible portions to a base plate or enclosure, as described above.

With reference to the individual figures, in FIG. 12B, the flexure 1200b includes flexible portions 1204 that both stem from a lateral portion of the flexure 1200b and extend horizontally (e.g., left to right).

In FIG. 12C, the flexure 1200c includes flexible portions 1210 that stem from top and bottom sections of the frame member 1206. The flexible portions 1210 then both extend laterally (e.g., left to right).

In FIG. 12D, the flexure 1200d includes flexible portions 1212 that include pairs of flexible beams. The pairs of flexible beams respectively stem from opposing sides (e.g., lateral portions) and then extend inward toward a central region of the flexure 1200d.

In FIG. 12E, the flexure 1200e includes flexible portions 1214 that include diagonally oriented pairs of flexible beams. The pairs of flexible beams respectively stem from corner regions of the flexure 1200e and extend inward toward a central region of the flexure 1200c.

In FIG. 12F, the flexure 1200f includes flexible portions 1216. The flexible portions 1216 can respectively stem from a corresponding side of the frame member 1206 and extend inward toward a central region of the flexure 1200f.

In FIG. 12G, the flexure 1200g includes flexible portions 1218 that include pairs of flexible beams. The pairs of flexible beams respectively stem from top and bottom portions of the frame member 1206, and then laterally inward toward a central region of the flexure 1200g.

In FIG. 12H, the flexure 1200h includes flexible portions 1220 that also include pairs of flexible beams. Like the pairs of flexible beams in FIG. 12G, the flexible portions 1220 respectively stem from top and bottom portions of the frame member 1206. However, instead of extending inward, the flexible portions 1220 extend laterally outward away from a central region of the flexure 1200h.

Any of the features, components, parts, including the arrangements and configurations thereof shown in FIGS. 12A-12H can be included, either alone or in any combination, in any of the other examples of devices, features, components, and parts shown in the other figures. Likewise, any of the features, components, parts, including the arrangements and configurations thereof shown in the other figures can be included, either alone or in any combination, in the example of the devices, features, components, and parts shown in FIGS. 12A-12H.

To the extent applicable to the present technology, gathering and use of data available from various sources can be used to improve the delivery to users of invitational content or any other content that may be of interest to them. The present disclosure contemplates that in some instances, this gathered data may include personal information data that uniquely identifies or can be used to contact or locate a specific person. Such personal information data can include demographic data, location-based data, telephone numbers, email addresses, TWITTER® ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to deliver targeted content that is of greater interest to the user. Accordingly, use of such personal information data enables users to calculated control of the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services or anytime thereafter. In another example, users can select not to provide mood-associated data for targeted content delivery services. In yet another example, users can select to limit the length of time mood-associated data is maintained or entirely prohibit the development of a baseline mood profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not intended to be exhaustive or to limit the embodiments to the precise forms disclosed. It will be apparent to one of ordinary skill in the art that many modifications and variations are possible in view of the above teachings.

What is claimed is:

1. A keyboard, comprising:
a keyboard housing including a base plate defining a trackpad opening; and
a trackpad assembly disposed within the trackpad opening, the trackpad assembly comprising:
a touch input plate configured to receive a user touch input and positioned above the base plate; and
a flexure positioned below the base plate and including:
a first attachment portion directly attached to the touch input plate via a connection extending through the base plate;
a second attachment portion attached to the base plate; and
at least one flexible portion connecting the first attachment portion to the second attachment portion and biasing the first attachment portion upward relative to the second attachment portion.

2. The keyboard of claim 1, wherein, in response to application of a downward force on the touch input plate, the touch input plate moves toward the base plate while bending the at least one flexible portion.

3. The keyboard of claim 1, wherein the flexure comprises a preformed bend.

4. The keyboard of claim 3, wherein:
the flexure comprises a flattened state and a flexed state;
a bottom portion of the preformed bend is biased upward toward the base plate to the flattened state when at rest; and the flexure is movable to the flexed state in response to the user touch input.

5. The keyboard of claim 1, wherein the at least one flexible portion comprises a set of flexible beams.

6. The keyboard of claim 5, wherein the set of flexible beams is positioned outside a perimeter of the first attachment portion.

7. The keyboard of claim 5, wherein flexible beams of the set of flexible beams are symmetrically arranged relative to a centerline of the flexure.

8. The keyboard of claim 1, wherein the first attachment portion comprises a frame member movable with the touch input plate relative to the second attachment portion.

9. The keyboard of claim 1, wherein the second attachment portion is stationary relative to the first attachment portion in response to receiving the user touch input.

10. The keyboard of claim 1, wherein the base plate is integrally formed with the keyboard housing.

11. A trackpad assembly, comprising:
a top panel having a top surface;
a housing panel;
a switch positioned between the top panel and the housing panel; and
a support positioned below the housing panel and connected with an upward bias to the top panel, the support comprising a lateral portion extending under the housing panel and below the switch;
wherein:
in response to an off-center input load applied at the top surface, the top panel rotates about an axis extending through the lateral portion of the support while depressing the switch; and
in response to a central input load applied at the top surface, the top panel translates downward and causes the support to flex against the upward bias.

12. The trackpad assembly of claim 11, wherein when the off-center input load is applied at the top surface, the lateral portion comprises:
a first lateral portion contacting a bottom side of the housing panel; and
a second lateral portion having moved away from the bottom side of the housing panel.

13. The trackpad assembly of claim 11, wherein when the central input load is applied at the top surface, the lateral portion comprises:
a first lateral portion having moved away from a bottom side of the housing panel; and
a second lateral portion having moved away from the bottom side of the housing panel.

14. The trackpad assembly of claim 11, wherein a click ratio for depressing the switch is the same irrespective of a location of an input load applied at the top panel.

15. The trackpad assembly of claim 11, wherein a bottom side of the housing panel is flush with a bottom side of the top panel.

16. The trackpad assembly of claim 11, wherein:
the support comprises a top surface configured to contact both of a bottom surface of the housing panel and a bottom surface of the top panel;
the trackpad assembly further comprises a bottom housing panel positioned below the support; and
the support comprises a bottom surface that faces the bottom housing panel.

17. A computing device, comprising:
an electronic display;
a controller unit connected to the electronic display; and
a keyboard comprising a set of key mechanisms and an input device communicatively coupled to the controller unit, the input device comprising:
a first layer configured to receive a touch input;
a housing having a recess to receive the first layer; and
a spring member attached to the first layer and to the housing, the spring member having a flattened shape and a flexed shape;
wherein the spring member is biased to the flattened shape when at rest and the spring member is movable to the flexed shape in response to the touch input.

18. The computing device of claim 17, wherein the spring member includes a convex surface facing the housing when the spring member is in the flexed shape.

19. The computing device of claim 17, wherein:
the spring member comprises a first spring beam and a second spring beam; and
the spring member comprises a rectangular frame connecting the first spring beam and the second spring beam.

20. The computing device of claim 19, wherein the first spring beam and the second spring beam are U-shaped.

* * * * *